United States Patent
Hill

(10) Patent No.: US 9,428,261 B2
(45) Date of Patent: Aug. 30, 2016

(54) HOUSING FOR AIRCRAFT MOUNTED COMPONENTS

(75) Inventor: John Leslie Paul Hill, West Springfield, MA (US)

(73) Assignee: PTI INDUSTRIES, INC., Enfield, CT (US)

( * ) Notice: Subject to any disclaimer, the term of this patent is extended or adjusted under 35 U.S.C. 154(b) by 830 days.

(21) Appl. No.: 13/600,497

(22) Filed: Aug. 31, 2012

(65) Prior Publication Data

US 2012/0326915 A1  Dec. 27, 2012

Related U.S. Application Data

(63) Continuation-in-part of application No. 12/720,051, filed on Mar. 9, 2010, now Pat. No. 8,828,163.

(51) Int. Cl.
| | |
|---|---|
| *G01S 13/93* | (2006.01) |
| *B64C 1/36* | (2006.01) |
| *H01Q 1/28* | (2006.01) |
| *H01Q 1/42* | (2006.01) |

(52) U.S. Cl.
CPC .............. *B64C 1/36* (2013.01); *G01S 13/9303* (2013.01); *H01Q 1/28* (2013.01); *H01Q 1/42* (2013.01); *Y10T 156/1034* (2015.01)

(58) Field of Classification Search
CPC ...... B64C 1/36; Y10T 156/1034; H01Q 1/42
See application file for complete search history.

(56) References Cited

U.S. PATENT DOCUMENTS

| | | | |
|---|---|---|---|
| 4,620,890 A | * | 11/1986 | Myers .................. B29C 70/34 |
| | | | 156/196 |
| 5,175,601 A | | 12/1992 | Fitts |
| 5,805,111 A | | 9/1998 | Brettner, III et al. |
| 5,971,046 A | | 10/1999 | Koch et al. |
| 6,945,111 B2 | | 9/2005 | Georgeson |
| 7,385,560 B1 | | 6/2008 | Maloratsky et al. |
| 7,443,334 B2 | | 10/2008 | Rees et al. |
| 7,492,307 B2 | | 2/2009 | Coulmeau |

* cited by examiner

*Primary Examiner* — Jeff Aftergut
*Assistant Examiner* — Jaeyun Lee
(74) *Attorney, Agent, or Firm* — Cantor Colburn LLP

(57) ABSTRACT

A traffic collision avoidance system (TCAS) device is provided. The device includes a radome having an antenna. A chassis is bonded to said radome about a periphery by a skirt layer. A housing is adhesively bonded to the radome, the skirt layer and the chassis. The housing has a substantially flat bottom portion with a wall extended about a periphery, the wall forming a lap joint with the chassis and radome.

6 Claims, 6 Drawing Sheets

HOUSING FOR AIRCRAFT MOUNTED COMPONENTS

CROSS-REFERENCE TO RELATED APPLICATIONS

The present application is a Continuation-in-Part application of U.S. patent application Ser. No. 12/720,051 filed on Mar. 9, 2010 now U.S. Pat. No. 8,828,163 which is incorporated herein by reference in its entirety.

BACKGROUND OF THE INVENTION

The subject matter disclosed herein relates in general to a housing for mounting components to an exterior of an aircraft, and in particular to a composite housing for traffic collision avoidance system (TCAS) type devices that minimizes or prevents the occurrence of corrosion due to environmental contaminants.

In areas of congested airspace or low visibility, it is desirable for a pilot of one aircraft to be warned of the presence of a nearby aircraft so the respective aircraft may maneuver the aircraft to avoid collision. One device, known as a traffic collision avoidance system (TCAS) employs a transponder mounted on the aircraft that communicates with transponders on nearby aircraft. In this way, the aircraft control systems automatically communicate and provide the pilots with appropriate and timely information about nearby aircraft.

TCAS devices are typically mounted on the external surface of the aircraft. In a typical configuration, a commercial aircraft will have two TCAS devices, one mounted on the underside of the aircraft and one mounted on the top side in an area adjacent to the cockpit. The TCAS device has three major components, a metal chassis, a polymer radome, and an antenna assembly. Bonding material is applied about the periphery of the chassis to couple the radome to the chassis and seal the antenna assembly from the external environment.

Since the TCAS devices are mounted on the outside of the aircraft, the devices need to operate over a wide environmental temperature range, typically on the order of −67° F. to 158° F. (−55 C to 70 C). This wide range of operating temperatures places a great deal of stress on the components of the TCAS device. In particular, the bonding layer between the chassis and the radome is subjected to stresses due to the disparity between the coefficients of thermal expansion of the chassis and the radome. Repeated thermal cycling of the TCAS device may then result in a breach in the bonding layer allowing condensation to migrate into the interior portion of the TCAS device. The entry of the condensation may then result in corrosion of the chassis and antenna assembly.

While existing TCAS devices are suitable for their intended purposes, there remains a need for improvements. In particular, there remains a need for improvements in reducing or preventing the infiltration of water and other environmental contaminants into the interior of the TCAS device.

BRIEF DESCRIPTION OF THE INVENTION

According to one aspect of the invention, a traffic collision avoidance system (TCAS) device is provided. The TCAS device includes a radome having an antenna. A chassis is bonded to the radome about a periphery by a skirt layer. A housing is adhesively bonded to the radome, the skirt layer and the chassis, the housing having a substantially flat bottom portion with a wall extended about a periphery to define an interior portion, the wall forming a lap joint with the chassis and radome.

According to another aspect of the invention, a method of producing a device that will be mounted to an exterior of an aircraft is provided. The method includes receiving an assembly having a radome, a chassis mounted to one side of the radome and a skirt member. A first flat housing layer is formed having a first end, a second end, a first side and a second side. The assembly is placed onto the first flat housing layer. The first end, the second end, the first side and the second side are bent about the assembly to form a housing, the housing being arranged in a lap joint arrangement with the radome and the chassis. The housing is cured.

According to yet another aspect of the invention, a housing for a device that is mounted to an exterior of an aircraft is provided. The device has a chassis and a radome. A first layer having substantially planar first surface is provided. The first layer having a first side, a second side opposite the first side, a first end arranged between the first side and the second side, and a second end opposite the first end. A second layer is arranged adjacent the first layer. The second layer having a substantially planar second surface, the second layer having a third side and a fourth side opposite, a third end arranged between the third side and the fourth side, and a fourth end opposite the third end. Wherein the first side, second side, third side, fourth side, first end, second end third end and fourth end form a wall extending about a periphery of the device, the wall forming a lap joint about the chassis and radome.

According to yet another aspect of the invention, a device for mounting to an exterior of an aircraft is provided that is produced according to the methods described herein.

According to yet another aspect of the invention, a TCAS device is provided that is produced according to the methods described herein.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
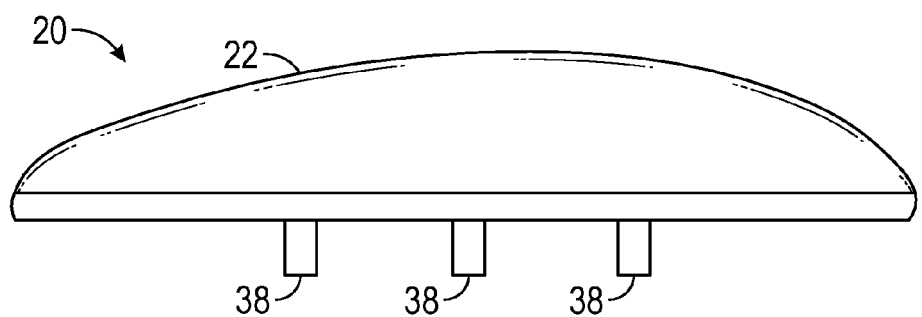
FIG. 1 is a side view of a traffic collision avoidance system (TCAS) device in accordance with an embodiment of the invention.
Figure 2:
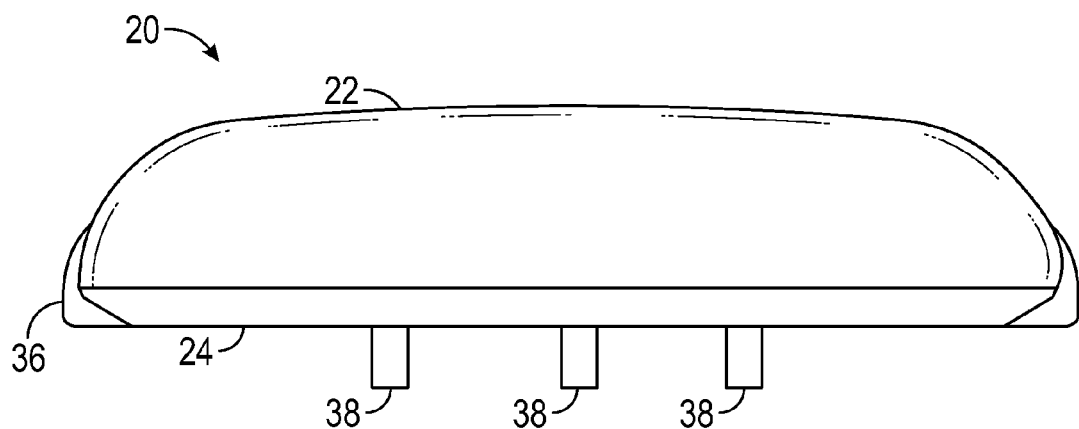
FIG. 2 is a front view, partially in section of the TCAS device of FIG. 1.
Figure 3:
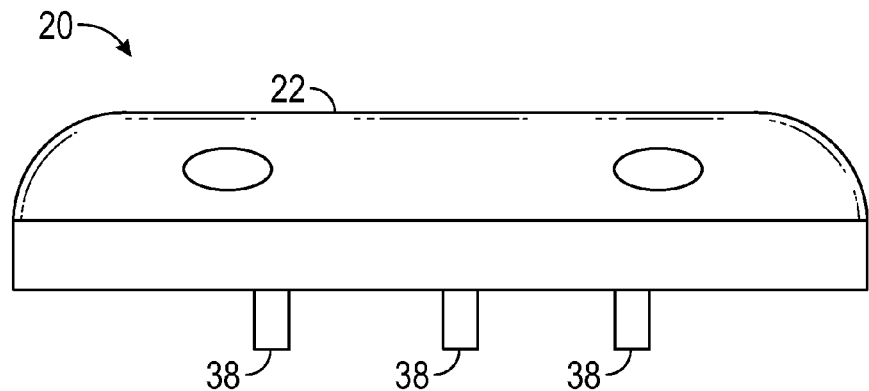
FIG. 3 is a front view of the TCAS device of FIG. 1.
Figure 4:
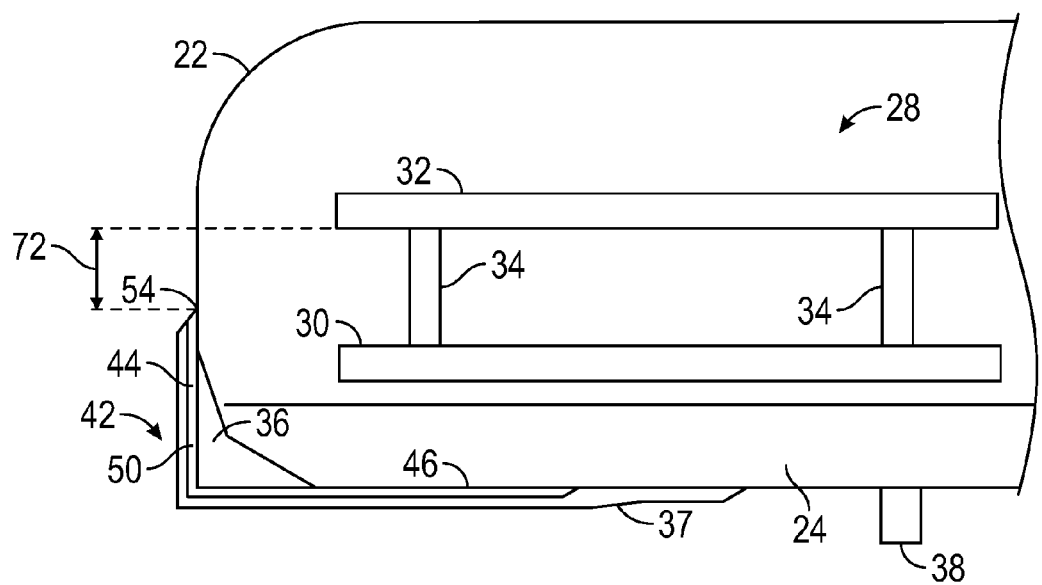
FIG. 4 is a partial sectional view of the TCAS device of FIG. 1.
Figure 5:
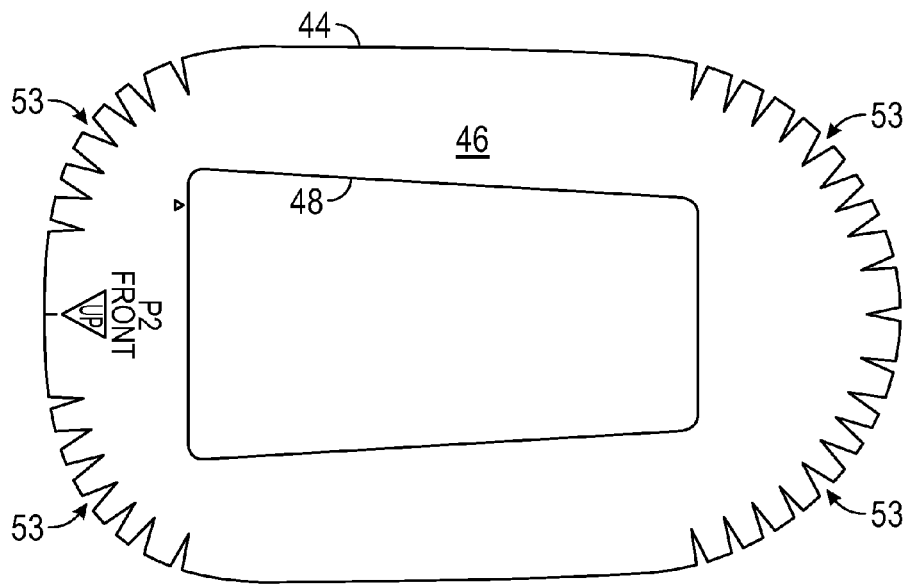
FIG. 5 is a top view of an inner layer of a housing in accordance with an embodiment of the invention.
Figure 6:
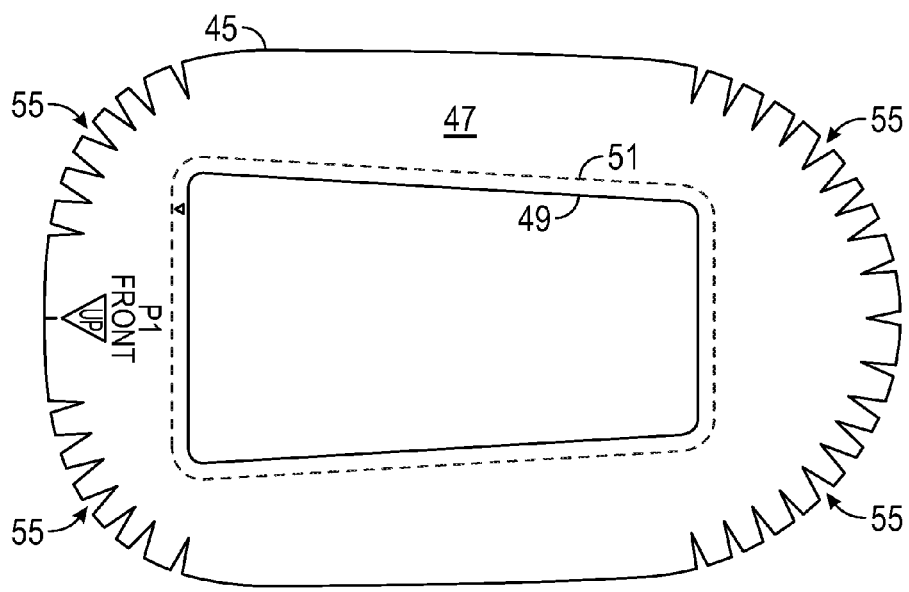
FIG. 6 is a top view of an outer layer of housing in accordance with an embodiment of the invention.
Figure 7:
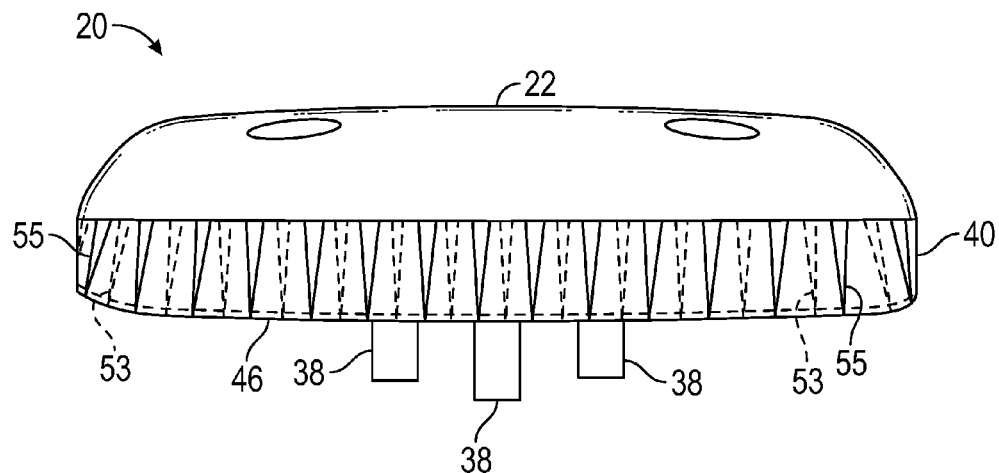
FIG. 7 is a front view of the TCAS device of FIG. 1 with the housing of FIGS. 5-6 assembled.

The detailed description explains embodiments of the invention, together with advantages and features, by way of example with reference to the drawings.

DETAILED DESCRIPTION OF THE INVENTION

An exemplary embodiment of a traffic collision avoidance system (TCAS) device 20 is illustrated in FIGS. 1-7. As will be discussed in more detail herein, the TCAS device 20 includes a housing that has a Coefficient of Thermal Expansion (CTE) that is similar to or equal to the CTE of a fiberglass skirt layer. The TCAS device 20 provides number of advantages in preventing corrosion to increase reliability and to extend useful operating life of the TCAS device 20.

It should be appreciated that while the exemplary embodiment makes reference to a TCAS device 20, the claimed invention should not be so limited. The TCAS device 20 may also be a wide angle augmentation system (WAAS), a European geostationary navigation overlay service (EG-NOS), a multi-functional satellite augmentation system (MSAS), or other type of navigation augmentation system for aircraft. Further, in some embodiments, the TCAS device 20 may be any device having a sealed interior portion that is mounted to the external fuselage of an aircraft.

The TCAS device 20 includes a radome 22 mounted to a chassis 24. In the exemplary embodiment, the chassis 24 is made from an aircraft grade aluminum alloy, such as 6061 for example. The radome 22 may be made from polymer materials such as polyethersulfone (PES) cover layer with urethane foam body. In one embodiment, a fiberglass skirt layer 36 encompasses the periphery of the chassis 24 and the radome 22 to further seal the interface of the chassis-radome assembly 22, 24. An antenna assembly 28 within the radome 22 typically includes a printed circuit board 30 and an antenna 32 that are separated by standoffs 34. In one embodiment, the printed circuit board 30 is bonded to chassis 24.

A plurality of terminals or connectors 38 are coupled to the printed circuit board 30 opposite the antenna 32. The connectors 38 pass through openings 40 in the chassis 24. The connectors 38 couple with conductors (not shown) in the aircraft to transmit signals between the TCAS device 20 and the aircraft's control systems (not shown).

The TCAS device further includes a housing 42. In the exemplary embodiment, the housing 42 is made from a suitable material, such as E-glass pre-impregnated with thermoset resin. E-glass has a tensile strength of 2000 MPa. It exhibits good heat resistance, electrical resistance and is hydrophobic (insensitive to moisture). The pre-impregnated E-glass has a CTE of 12.0 um/m C, which is similar to the fiberglass skirt layer 36. Epoxy resin may be used as the matrix material. In the exemplary embodiment, the housing 42 is made from materials that may be cured at a temperature less than the temperature limit of the device 20. In the exemplary embodiment, the materials have a cure temperature of less than or equal to 160° F.

The housing 42 includes a substantially flat planar portion having an opening on the bottom. It should be appreciated that the opening aligns with chassis 22 to allow the connectors 38 to exit the TCAS device 20. In one embodiment, the opening is large enough to allow a serial number tag on the bottom of the chassis 24 to be visible. Arranged about the opening is a seal. When installed on the aircraft, the seal contacts the aircraft fuselage forming a barrier that prevents the infiltration of water and other contaminants. In the one embodiment, the seal is an O-ring molded into the planar portion. In another embodiment, the planar portion 46 includes a slot sized to receive an O-ring.

The housing 42 is formed using a stepped lap technique from a pair of planar layers 44, 45. This technique forms a lap joint that encapsulates the outer portion of the chassis 24, skirt layer 36 and the outer periphery portion of the radome 22. This arrangement provides for 60 in$^2$ (0.0387 m$^2$) of bond surface as compared to 8 in$^2$ (0.0052 m$^2$) of the skirt layer 36. It should be appreciated that this increase in the bonding surface area provides for a significantly more reliable sealing arrangement to reduce or prevent the migration of water or other environmental contaminants to the antenna assembly 28.

The planar layers 44, 45 are bent or wrapped around the outer portion of the chassis 24, the skirt layer 36 and the outer portion of the radome 22 to form a wall 50 that extends about the periphery of the device 20. In one embodiment, a plurality of holes (not shown) may be formed in the planar portion 46. The holes are coaxial with other holes in the chassis 24 and radome 22. The holes are sized to receive bolts that couple the TCAS device 20 to the aircraft.

In one embodiment, the wall 50 is arranged to have a height such that the antenna 32 is spaced a distance 72 from a lip 54. It should be appreciated that by positioning the antenna 32 apart from the lip 54, the housing 42 should not interfere with the transmission or reception of signals from other TCAS devices.

In the exemplary embodiment, the housing 42 is a laminar structure that includes a second layer 45 bonded to the first layer 44. The first layer includes a planar portion 46 having an opening 48. The second layer 45 also includes a planar portion 47 having an opening 49. The opening 49 is smaller than the opening 48 such that the second layer 45 has a portion 37 that overlaps the first layer 44 and contacts the bottom of the chassis 24. As will be discussed in more detail below, both layers have ends that may include a plurality of V-shaped notches or "darts" 53, 55 that allow the layers to be bent or wrapped around the periphery of the chassis 24 and radome 22 without wrinkling or folding the layer. The darts 53, 55 are positioned such that when the layers 44, 45 are wrapped around the chassis 24 and radome 22, the darts 53 do not overlap with the darts 55 (FIG. 7) to inhibit the migration of contaminants to the device 20.

Figure 11:
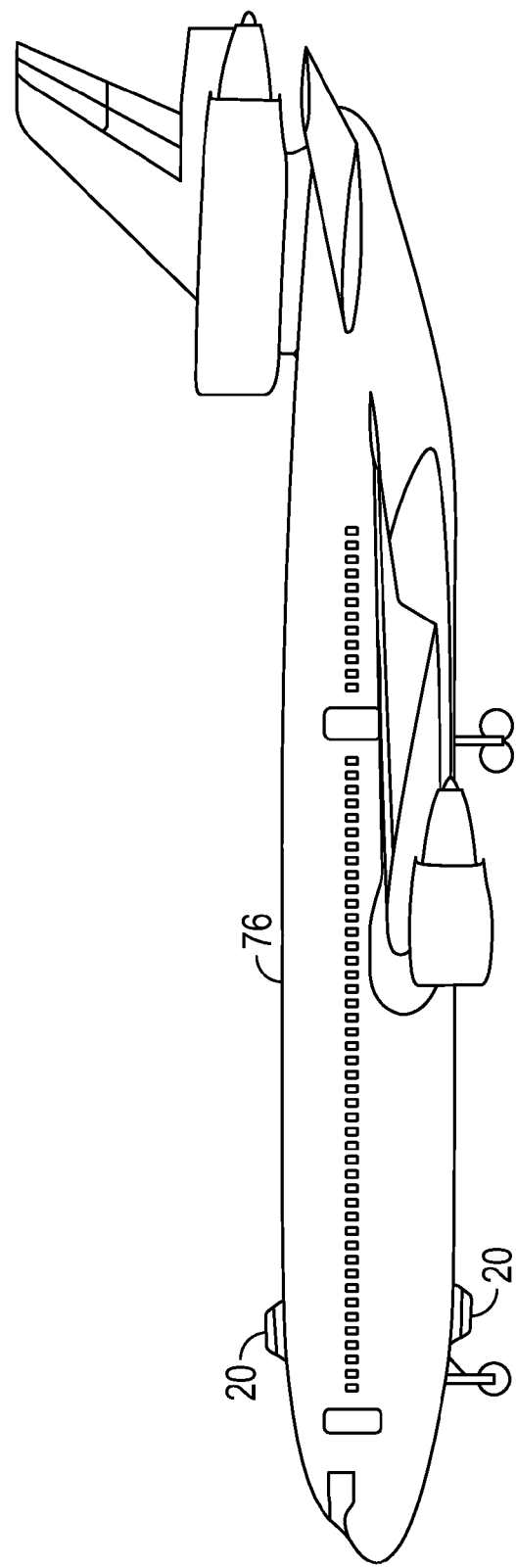

An exemplary embodiment of an application for the TCAS device is shown in FIG. 11. In this embodiment, the TCAS device 20 may be installed on an aircraft 76. The TCAS device 20 may be disposed on the top or the bottom of the fuselage of the aircraft 76 or other areas that are not shielded from radar interrogation.

Figure 8:
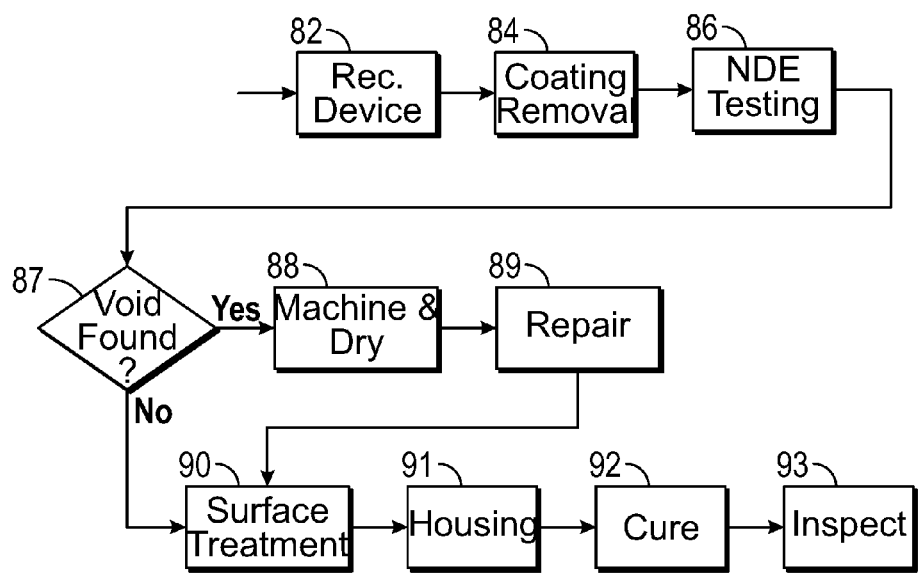
FIG. 8 is a flow diagram of a process for producing a TCAS device.

An exemplary process 80 for producing the TCAS device 20 is illustrated in FIG. 8. The process 80 starts by receiving the assembled chassis 24 and radome 22 in block 82. The process 80 then moves to block 84 where a coating and a cover (sometimes referred to as a "poly boot", not shown) are removed from chassis 24 and radome 22. Next, the process 90 moves to block 86 where the assembly is non-destructively tested to generate a report indicating any bond line failures. The inspection may be conducted using a device such as an NDI Thermograph System for example. If a bond line failure is found during inspection in block 87, the device 20 moves to block 88. If no voids are found, the process 80 moves to block 90.

In block 88, the device 20 is dried. Devices that have voids are machined for removal of trapped water vapor. In the exemplary embodiment, 0.125 inch (0.0032 m) holes are machined directly into the areas previously identified and mapped during the inspection. The machining is performed along the bond line between the chassis 24 and the skirting layer 36. This location is controlled by a drill guide and machining on a CNC vertical machining center. The locations of the vents are placed close to the printed circuit board 30 so as to increase the vapor transmission away from the antenna circuit during the drying (baking) step. The machining of the holes is controlled to reduce or eliminate "pushed through" material chips and foam damage. Vent holes are vacuum cleared to remove residual chips and then wiped with a solvent such as Methyl ethyl ketone (butanone) or MEK for example.

The device 20 is then placed in a heated convention dry box for a predetermined amount of time to remove moisture. In the exemplary embodiment, the predetermined baking time is 48 hours. After the predetermined amount of time has expired, the device is placed in a room temperature dry box for residual gas analysis (RGA). If the device 20 does not pass the RGA, it is placed back in the convection dry box for equal to or greater than 12 hours. This cycle is repeated until the device 20 passes the RGA.

Within 24 hours of drying, the device 20 is repaired by filling the machined holes with adhesive in block 89. In the exemplary embodiment, the adhesive is a resin adhesive such as Hysol EA 956 for example. The holes and the surrounding area are warmed to a temperature of less than or equal to 160° F. The adhesive is injected into the machined holes using a syringe. Adhesive is allowed to squeeze out of the surrounding machined holes and faying surface. A layer of peal ply is placed on the repair to preserve the surface. If the repair step of block 89 is not completed within 24 hours, the device 20 may be sealed in a 3 mm heat seal poly sleeve tube, with a desiccant bag and a 10-60% humidity indicator tab.

Next the process moves to block 90 where the chassis 24 is prepared by surface treating. A pre-secondary bond preparation treatment, such as Sol-gel (AC-130) may be used for example. The process then moves to block 91 where the housing 42 is formed. Each of the two layers 44, 45 of the pre-impregnated E-glass material is individually cut to generate the size and locations of the darts 53, 55 to allow them to translate around the corners of the chassis 24 and radome 22 without creating wrinkles in the layer. The mounting hole locations and the end of ply (EOP) dimensions may also be formed. Each layer 44, 45 is sized such that the EOP of each layer 44, 45 is progressively longer, creating an upper edge that is "stepped" rather than both layers ending at the same position/location. In this embodiment, the "step" will only be the consolidated thickness of one-ply of material (e.g. 0.009 inches). This provides advantages in allowing a good electro-mechanical bond between the device 20 and the aircraft fuselage.

Figure 9:
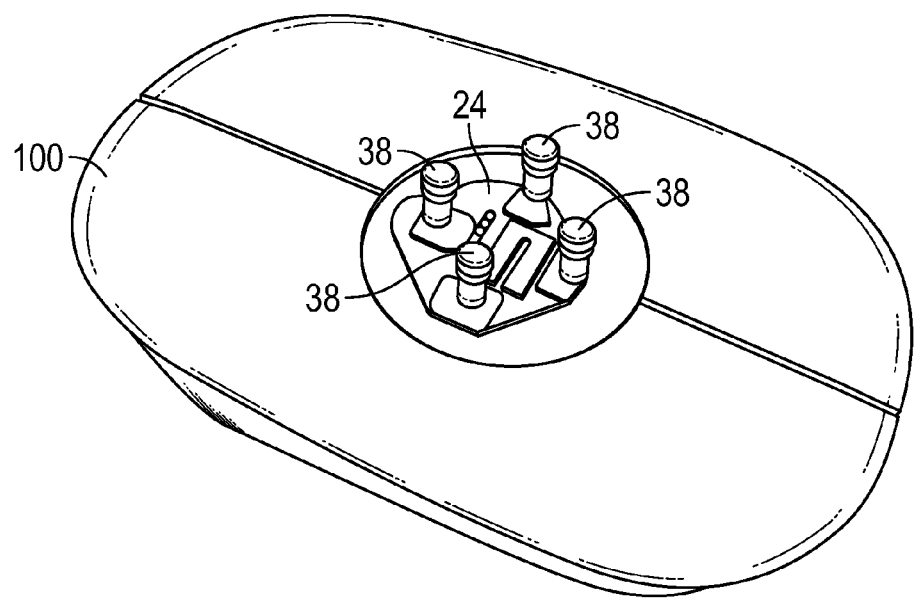
FIG. 9 is an illustration of the TCAS device of FIG. 1 positioned in a caul.

After the layers 44, 45 are prepared they are applied to the chassis 24 and skirt layer 36 using fixtures (e.g. templates) to ensure they are properly positioned. The device 20 will then be covered with a "peel ply", a thin nylon coated fabric that discourages the adhesion of any squeezed out resin and will facilitate the subsequent application of primer prior to paint. This is desirable as any cured resin left on the antenna may require mechanical removal (e.g. sanding) which may affect the thickness and therefore transmissibility of radio waves. An elastomeric membrane, or caul 100 (FIG. 9), is placed over the device 20 to assist in providing uniform pressure over the surface of the device 20 during the consolidation process.

Figure 10:
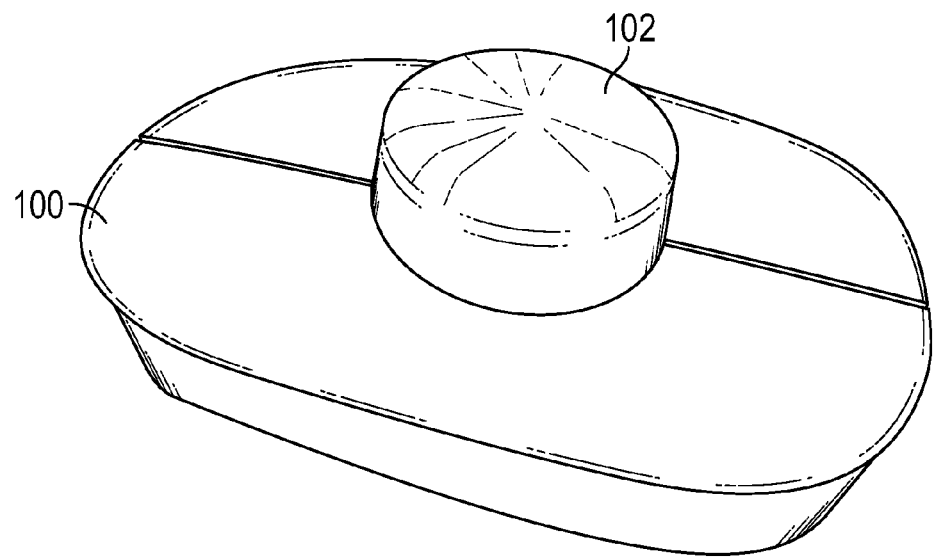
FIG. 10 is an illustration of the TCAS device of FIG. 1 assembled for a curing process; and, FIG. 11 is an illustration of the TCAS device of FIG. 1 installed on an aircraft.

The caul 100 also provides advantages in creating a smooth, uniform surface and reducing the potential for wrinkles or high spots which could occur with a vacuum bag alone. Another advantage of the elastomeric caul is that it will conform to surface irregularities. An aluminum cap 102 (FIG. 10) is placed over the connectors 38 to prevent damage to them while also preventing resin from entering the O-ring groove in the chassis 24.

Next, the process 80 proceeds to block 92 where the device 20 with housing 42, caul 100 and cap 102 are placed into an envelope bag. The bag is fitted with a vacuum port for consolidation pressure and a thermocouple for monitoring cure temperature. Vacuum is then applied to generate a consolidation pressure (e.g. 1 atmosphere) and the assembly is placed into an oven. As the layers 44, 45 heat at a predetermined rate, the excess resin will flow out, taking with it any entrapped air. This is advantageous in reducing or minimizing the amount of air within the layers 44, 45 to provide a desirable inter-laminar shear property and low void content.

After removing the device 20 from the assembly, the process 80 moves to block 93 where the device 20 is inspected for bond uniformity voids and defects. This inspection may be performed using visual, tap test or thermography.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of producing a device that will be mounted to an exterior of an aircraft comprising:
   receiving an assembly having a radome, a chassis mounted to one side of the radome and a skirt member;
   forming a first flat housing layer having a first end, a second end, a first side and a second side;
   placing the assembly onto the first flat housing layer;
   bending the first end, the second end, the first side and the second side about the assembly to form a housing, the housing being arranged in a lap joint arrangement with the radome and the chassis; and,
   curing the housing.

2. The method of claim 1 further comprising:
   forming a second flat housing layer having a third end, a fourth end, a third side and a fourth side; and,
   wherein the housing is formed by bending the second flat housing layer around the first flat housing layer after the first flat housing layer is bent around the assembly.

3. The method of claim 2 further comprising:
   determining the location of voids in the assembly;
   forming holes adjacent the voids;
   drying the assembly; and
   inserting epoxy into the holes prior to forming the housing.

4. The method of claim 3 wherein the first end and the second end each have a first plurality of darts.

5. The method of claim 4 wherein the third end and the fourth end each have a second plurality of darts.

6. The method of claim 5 wherein the first plurality of darts and the second plurality of darts are positioned in a non-overlapping arrangement when bent around the assembly.

* * * * *